(12) United States Patent
Matsuyama et al.

(10) Patent No.: US 7,327,392 B2
(45) Date of Patent: Feb. 5, 2008

(54) SIGNAL PROCESSING APPARATUS

(75) Inventors: Hisashi Matsuyama, Ogaki (JP); Tohru Watanabe, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 717 days.

(21) Appl. No.: 10/941,531

(22) Filed: Sep. 15, 2004

(65) Prior Publication Data

US 2005/0062862 A1  Mar. 24, 2005

(30) Foreign Application Priority Data

Sep. 24, 2003  (JP) .............................. 2003-331851

(51) Int. Cl.
*H04N 5/217* (2006.01)
*H04N 9/64* (2006.01)

(52) U.S. Cl. ...................... 348/246; 348/241; 348/243; 348/247; 348/251

(58) Field of Classification Search ........ 348/241–251; 386/46–51
See application file for complete search history.

(56) References Cited

U.S. PATENT DOCUMENTS

| 5,327,246 | A  | * | 7/1994  | Suzuki ....................... 348/246 |
| 6,157,407 | A  | * | 12/2000 | Kobayashi .................. 348/241 |
| 6,307,393 | B1 | * | 10/2001 | Shimura ..................... 324/765 |
| 6,323,900 | B1 | * | 11/2001 | Kobayashi .................. 348/241 |
| 6,396,539 | B1 | * | 5/2002  | Heller et al. ................ 348/246 |
| 6,614,473 | B1 | * | 9/2003  | Kijima ....................... 348/243 |
| 6,642,960 | B1 | * | 11/2003 | Kohashi et al. ............. 348/246 |
| 6,822,679 | B1 | * | 11/2004 | Kulhalli et al. ............. 348/246 |
| 6,829,007 | B1 | * | 12/2004 | Bilhan et al. ............... 348/243 |
| 6,857,144 | B1 | * | 2/2005  | Huang .......................... 5/86.1 |
| 6,970,193 | B1 | * | 11/2005 | Kidono et al. ............. 348/245 |
| 6,980,241 | B2 | * | 12/2005 | Aruga et al. ................ 348/241 |
| 7,092,018 | B1 | * | 8/2006  | Watanabe ................... 348/247 |
| 7,098,950 | B2 | * | 8/2006  | Yamamoto et al. ......... 348/243 |
| 7,129,975 | B2 | * | 10/2006 | Levine et al. .............. 348/246 |
| 7,268,812 | B2 | * | 9/2007  | Sato et al. .................. 348/246 |
| 2003/0128285 | A1 | * | 7/2003 | Itoh .......................... 348/246 |
| 2004/0075759 | A1 | * | 4/2004 | Sato et al. .................. 348/246 |
| 2006/0238630 | A1 | * | 10/2006 | Moody et al. ............... 348/247 |

FOREIGN PATENT DOCUMENTS

JP          06-086095        3/1994

* cited by examiner

*Primary Examiner*—David Ometz
*Assistant Examiner*—Pritham D Prabhakher
(74) *Attorney, Agent, or Firm*—Hogan & Hartson LLP

(57) ABSTRACT

A signal processing apparatus including a clamp pulse generation circuit for generating a clamp pulse in synchronization with an image signal, a clamp circuit for clamping a signal of a black reference value in response to the clamp pulse, and a defect detection circuit for detecting a defective pixel included in an optical black area, wherein the clamp pulse generation circuit cancels a rise of the clamp pulse when a position of the defective pixel detected by the defect detecting circuit and a position of a rise state of the clamp pulse overlap with each other.

6 Claims, 7 Drawing Sheets

SIGNAL PROCESSING APPARATUS

CROSS-REFERENCE TO RELATED APPLICATION

The entire disclosure of Japanese Patent Application No. 2003-331851 including specification, claims, drawings and abstract is incorporated herein by reference in its entirety.

BACKGROUND OF THE INVENTION

1. Field of the Invention

The present invention relates to a signal processing apparatus for detecting a defective pixel included in a light-receiving pixel area and an optical black area of an imaging device to correct the detected defective pixel.

2. Description of the Related Art

FIG. 8 is a block diagram showing the configuration of a conventional imaging device. The imaging device shown in FIG. 8 includes an analog processing circuit 4, a clamp pulse generation circuit 68, an A/D conversion circuit 16 and a digital processing circuit 17.

As shown in FIG. 9, in a CCD solid-state imaging device, a plurality of light-receiving pixels are arranged in a matrix to form a light-receiving pixel area 2i, in which information electric charges to be generated according to incident light are stored in each light-receiving pixel. An optical black area 2b shielding light by means of an aluminum material or the like is set at the peripheral portion of the light-receiving pixel area 2i. Also in the optical black area 2b, storage pixels (hereinafter referred to as black pixels) are arranged similarly in the light-receiving pixel area 2i. In such a CCD solid state imaging device, information electric charges stored in the black pixels are transferred together with the information electric charges stored in the light-receiving pixels. Consequently, as shown in FIG. 10, black reference values B(t) from the black pixels are included in parts of a horizontal scanning period or a vertical scanning period of an output signal Y(t) from the CCD solid state imaging device.

The analog processing circuit 4 is composed of a clamp circuit 6, a CDS circuit 12 and an AGC circuit 14. The analog processing circuit 4 performs analog signal processing of the CCD output signal Y(t). The clamp circuit 6 clamps a black reference value B(t) included in the CCD output signal Y(t) in response to a clamp pulse CLP output from the clamp pulse generation circuit 68, and fixes the electric potential of all of the black levels of the CCD output signal Y(t). The clamp circuit 6 analogously averages the input black reference value B(t) for a raised period of the clamp pulse CLP while clamping the black reference value B(t). The CDS circuit 12 samples the feedthrough level and the signal level of a signal output from the clamp circuit 6 to output a signal obtained by subtracting the feedthrough level from the signal level. The AGC circuit 14 integrates a signal output from the CDS circuit 12 per period of a screen or per vertical scanning period, and generates an image signal Y(t1) the gain of which is adjusted in order that the integrated value may fall into a predetermined range.

The clamp pulse generation circuit 68 generates the clamp pulse CLP on the basis of a horizontal synchronizing signal HD and a reference clock CK, and outputs the generated clamp pulse CLP to the clamp circuit 6. The clamp pulse generation circuit 68 raises the clamp pulse CLP in a predetermined period at the beginning of a horizontal scanning period 1H, and thereby sets a clamp period in order to clamp the black reference value B(t) appearing at the head of the CCD output signal Y(t) for one line.

The A/D conversion circuit 16 quantizes the image signal Y(t1) output from the analog processing circuit 4 per one pixel to generate first image data Y(n1), and quantizes the black reference value B(t) clamped by the clamp circuit 6 to generate black data B(n). The A/D conversion circuit 16 then subtracts the black data B(n) from the first image data Y(n1) to generate second image data Y(n2). The value of the second image data Y(n2) is a value to be actually displayed after being reproduced.

The digital processing circuit 17 performs digital signal processing such as color separation and a matrix operation of the second image data Y(n2) output from the A/D conversion circuit 16 to generate third image data Y(n3) including a luminance signal and a color difference signal. Moreover, the digital processing circuit 17 performs exposure control for controlling the exposure state of the CCD solid state imaging device, and white balance control for controlling the white balance of the CCD output signal Y(t).

In the configuration described above, there is a case where a defective pixel exists in each area of the light-receiving pixel area and the optical black area. The defective pixel is produced owing to a scratch formed in a manufacturing process of the CCD solid state device, deterioration to be generated as time elapses, or the like.

For example, when the defective pixel exists in the optical black area, a black reference value having a remarkably high voltage level is included in the black reference values to be output when the black reference values obtained from the optical black area have a positive polarity. In this case, the voltage level of the black reference value after clamping is raised and the value of black data B(t) becomes large. As a result, the value of the second image data Y(n2) becomes smaller than an actual signal level. Such a failure is generated over the image data for one line in the case where the clamp processing is performed once for one line. As a result, when a reproduction image for a screen is displayed, the image becomes a crosscut image in which only some lines are seen to be relatively darker.

On the other hand, a defective pixel exists in the light-receiving area, a defective image signal is always output from the same light-receiving pixel, and fixed pattern noise is consequently generated in a reproduction image. Such noise remarkably decreases the visibility of a subject image, and emphasizes the noisy feeling of the whole screen as a result. As means for solving the problem of such a defective pixel, there is a method for reducing the noisy feeling by performing a filtering processing of blurring the whole screen. However, because the filtering processing is evenly applied to pixels other than the defective pixel in this method, the method has a problem of deteriorating the resolution of the screen.

SUMMARY OF THE INVENTION

According to the present invention, a signal processing apparatus for performing predetermined processing of an image signal output from an imaging device including an optical black area in at least a part of a light-receiving pixel area, the image signal including a black reference value corresponding to the optical black area in a part of a horizontal scanning period or a vertical scanning period, includes: a clamp pulse generation circuit for generating a clamp pulse in synchronization with the image signal; a clamp circuit for clamping the black reference value in response to the clamp pulse; and a defect detection circuit for detecting a defective pixel included in the optical black area, wherein the clamp pulse generation circuit cancels a rise of the clamp pulse when a position of the defective pixel in the optical black area, the defective pixel detected by the defect detecting circuit, and a position of a rise state of the clamp pulse overlap with each other in the defect detection circuit.

BRIEF DESCRIPTION OF THE DRAWINGS

Preferred embodiment(s) of the present invention will be described in detail based on the following figures, wherein.

DESCRIPTION OF PREFERRED EMBODIMENTS

Figure 1:
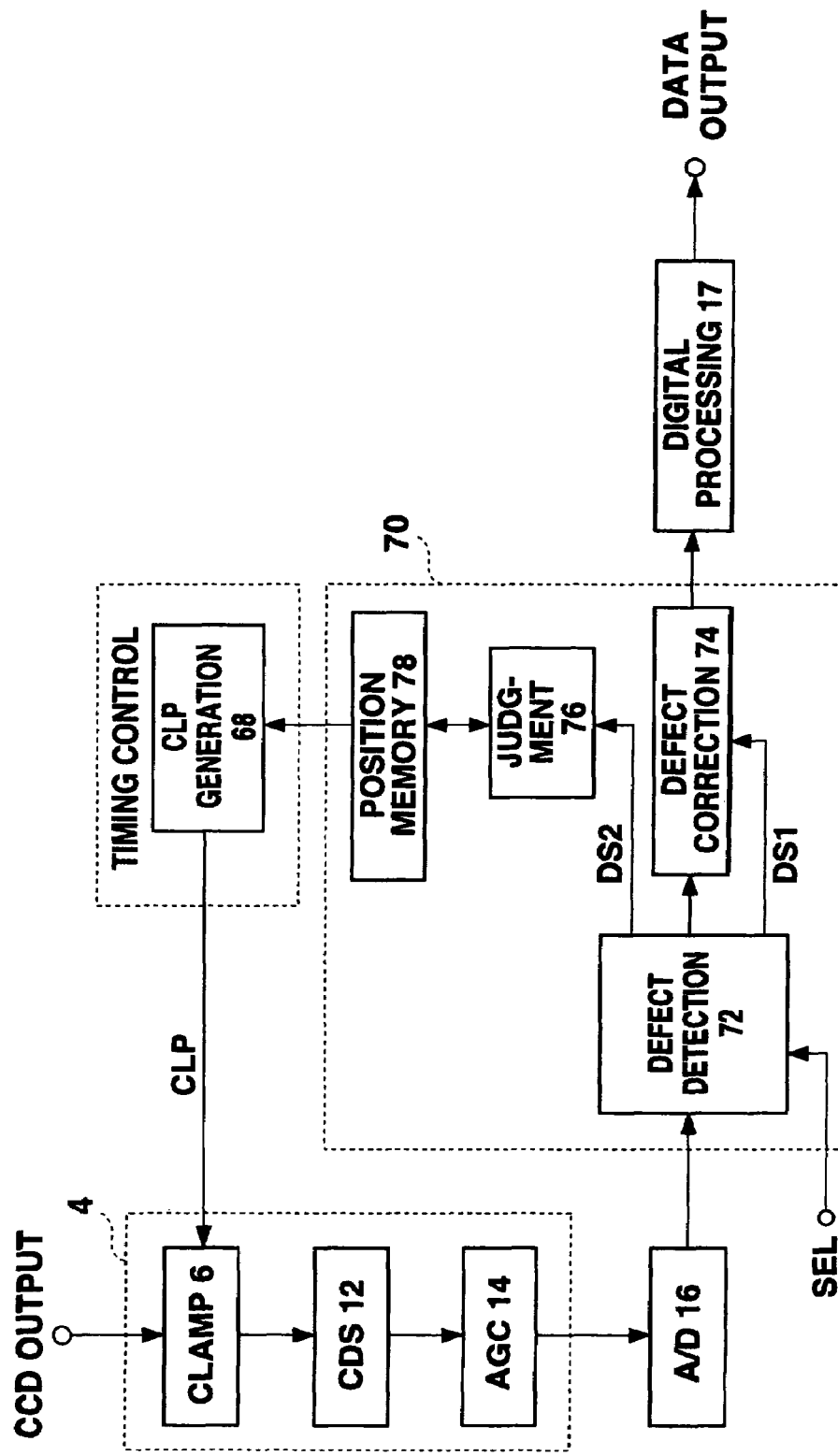
FIG. 1 is a block diagram showing the configuration of a first embodiment of the present invention.
Figure 8:
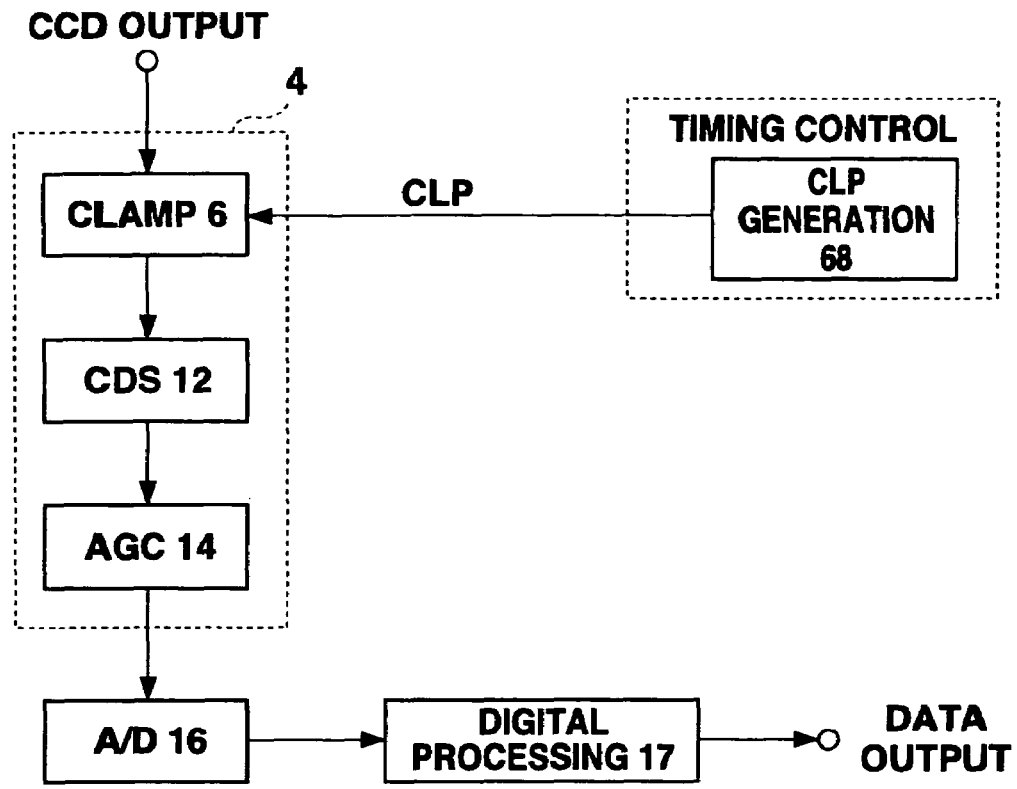
FIG. 8 is a block diagram showing the configuration of a conventional imaging apparatus.
Figure 9:
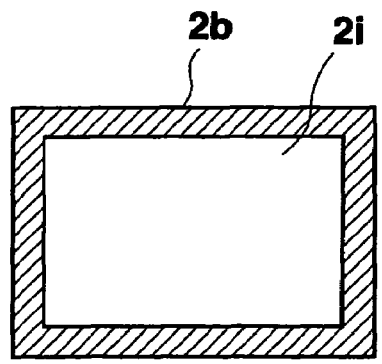
FIG. 9 is a view showing a light-receiving area and an optical black area.
Figure 10:
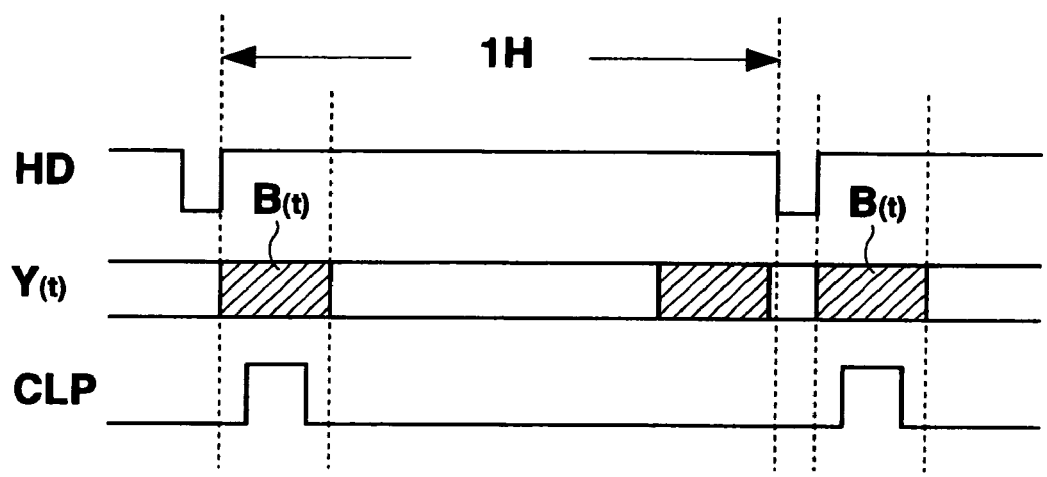
FIG. 10 is a timing chart showing clamp timing.

FIG. 1 is a block diagram showing the configuration of an embodiment of the present invention. In the drawing, the same components as those of the configuration shown in FIG. 8 are denoted by the same reference marks as those of the configuration shown in FIG. 8.

A signal processing apparatus 1 shown in FIG. 1 includes the analog processing circuit 4, the A/C conversion circuit 16, a defect processing circuit 70, the clamp pulse generation circuit 68 and the digital processing circuit 17. The analog processing circuit 4 is composed of the clamp circuit 6, the CDS circuit 12 and the AGC circuit 14. The analog processing circuit 4 performs the predetermined analog signal processing of the CCD output signal Y(t). The clamp circuit 6 clamps the black reference value B(t) included in the CCD output signal Y(t) in response to the clamp pulse CLP output from the clamp pulse generation circuit 68, and fixes the electric potential of all of the black levels of the CCD output signal Y(t). The CDS circuit 12 samples the feedthrough level and the signal level of a signal output from the clamp circuit 6 to output a signal obtained by subtracting the feedthrough level from the signal level. The AGC circuit 14 integrates a signal output from the CDS circuit 12 per period of a screen or per vertical scanning period, and generates the image signal Y(t1) the gain of which is adjusted in order that the integrated value may fall into a predetermined range.

The A/D conversion circuit 16 quantizes the image signal Y(t1) output from the analog processing circuit 4 per one pixel to generate the first image data Y(n1), and quantizes the black reference value B(t) clamped by the clamp circuit 6 to generate the black data B(n). The A/D conversion circuit 16 then subtracts the black data B(n) from the first image data Y(n1) to generate the second image data Y(n2).

The defect processing circuit 70 includes a defect detection circuit 72, a defect correction circuit 74, a judgement circuit 74 and a position memory 78. The defect detection circuit 72 sequentially takes in the second image data Y(n2) output sequentially from the A/D conversion circuit 16, and detects the image data of a defective pixel included in the second image data Y(n2).

Figures 2, 3:
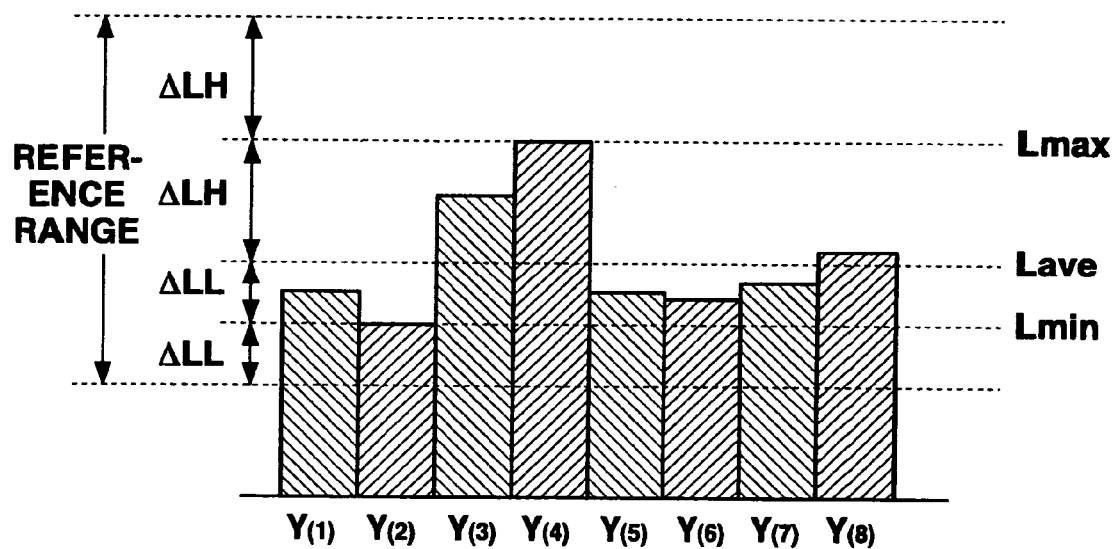
FIG. 2 is a view for illustrating a noticed pixel and peripheral pixels.
FIG. 3 is a view for illustrating a judgment reference range.

For example, as shown in FIG. 2, in the case of detecting the defective pixel by referring to the second image data Y(1)-Y(8) of eight pixels around the second image data Y(0) of a noted pixel, the defect detection circuit 72 sets a judgment reference range using the second image data Y(1)-Y(8) of the peripheral pixels. FIG. 3 is a view for illustrating an example of the setting of the judgment reference range. The defect detection circuit 72 first generates an average level Lave by averaging the second image data Y(1)-Y(8), and then selects the maximum level Lmax and the minimum level Lmin of the second image data Y(1)-Y(8). After that, the defect detection circuit 72 adds a difference ΔLH between the average level Lave and the maximum level Lmax to the maximum level Lmax to set the upper limit of the judgment reference range. Then the defect detection circuit 72 subtracts a difference ΔLL between the average level Lave and the minimum level Lmin from the minimum level Lmin to set the lower limit of the judgment reference range.

As another example of the setting of the judgment reference range, there is also the following method. First, the defect detection circuit 72 generates the maximum level Lmax and the minimum level Lmin of the second image data Y(1)-Y(8), and sets the center of the maximum level Lmax and the minimum level Lmin as a center level Lcen. After that, the defect detection circuit 72 adds a difference ΔL between the center level Lcen and the maximum level Lmax to the maximum level Lmax to set the upper limit of the judgment range. The defect detection circuit 72 then subtracts a difference ΔL between the center level Lcen and the minimum level Lmin from the minimum level Lmin to set the lower limit of the judgment reference range.

When input second image data Y(0) is outside of the judgment reference range, the defect detection circuit 72 judges that the pixel is a defective light-receiving pixel, and raises a first detection signal DS1 to the defect correction circuit 74. At this case, the defect detection circuit 72 outputs the second image data Y(0) of the noted pixel and the peripheral second image data Y(1)-Y(8) to the defect correction circuit 74 in addition to the raising of the first detection signal DS1. That is, the defect detection circuit 72 incorporates a memory circuit and a delay circuit therein, and outputs the second image data Y(0) of the noted pixel and the peripheral second image data Y(1)-Y(8) after delaying them for the processing time of the judgment operation.

Moreover, the defect detection circuit 72 also similarly refers to peripheral black data B(1)-B(8) of black data B(0) generated by the A/D conversion circuit 16 to generate a judgment reference range, and performs the comparison of the black data B(0) with the generated judgment reference range. Then, when the defect detection circuit 72 detects a defective black pixel, the defective detection circuit 72 raises a second detection signal DS2 to the judgement circuit 76. Incidentally, at the time of the detection of the defective black pixel of the black data B(n), the defect detection circuit 72 outputs only the second detection signal DS2, and does not output the black data B(0) of the noted pixel and the peripheral black data B(1)-B(8).

Moreover, the defect detection circuit 72 is configured to receive a selection signal SEL generated by a timing control circuit or a control microcomputer, and switches its processing according to the selection signal SEL. For example, when the selection signal SEL instructs the detection of a defective black pixel, the defect detection circuit 72 performs its detection operation only for a period during which the black data B(n) is input, and stops its operation for the period during which the second image data Y(n2) is input. Conversely, when the selection signal SEL instructs the detection of a defective light-receiving pixel, the defect detection circuit 72 performs its detection operation only for a period during which the second image data Y(n2) is input.

The defect correction circuit 74 generates correction data Y'(n) on the basis of the peripheral pixels around the pixel of the second image data Y(n2). In addition, the defect correction circuit 74 replaces the second image data Y(n2), which is judged to be the data of a defective light-receiving pixel, with the correction data Y'(n2). For example, the defect correction circuit 74 generates the correction data Y'(n2) by averaging four pixels around the second image data Y(n2) of a noticed pixel. The defect correction circuit 74 replaces the second image data Y(n2) of the noted pixel with the correction data Y'(n2) only when the first detection signal DS1 is raised, and outputs the replaced correction data Y'(n2).

The judgement circuit 76 monitors the second detection signal DS2, and judges the black pixel at which the second detection signal DS2 is raised to be a candidate for a defective black pixel. The judgment circuit 76 then generates the position information of the black pixel judged to be the candidate for the defective black pixel to output the generated position information to the position memory 78. Moreover, the judgment circuit 76 monitors the second detection signal DS2 over a plurality of screens, and compares a result of the monitoring with the position information stored in the position memory 78 to judge a true defective black pixel among the candidates for the defective black pixel. That is, by monitoring the frequency of the setting of the same black pixel as a candidate for a defect over a plurality of screens, the judgment circuit 76 confirms the continuity of the defect judgment and prevents the acknowledgment of a black pixel at which noise is generated owing to a primary factor other than a defect as the defective black pixel. Then, the judgment circuit 76 again outputs the position information of the pixel judged to be the defective black pixel to the position memory 78.

The position memory 78 stores the position information from the judgment circuit 76 to output the stored position information to the clamp pulse generation circuit 68. The position memory 78 is composed of a storage medium capable of freely reading and writing such as a DRAM, an SRAM and a flash memory. The position memory 78 receives the position information of a candidate for the defective black pixel and the position information of the true defective black pixel, both information judged by the judgment circuit 76, and stores them therein. When the position memory 78 is a nonvolatile memory such as the flash memory, the position memory 78 can continue to store data even when the power supply thereof is cut off.

The digital processing circuit 17 performs digital signal processing such as color separation and a matrix operation of the second image data Y(n2) or Y'(n2) output from the defect correction circuit 74 to generate third image data Y(n3) including a luminance signal and a color difference signal. Moreover, the digital processing circuit 17 performs exposure control for controlling the exposure state of a CCD solid state imaging device, and white balance control for controlling the white balance of a CCD output signal Y(t).

Figure 4:
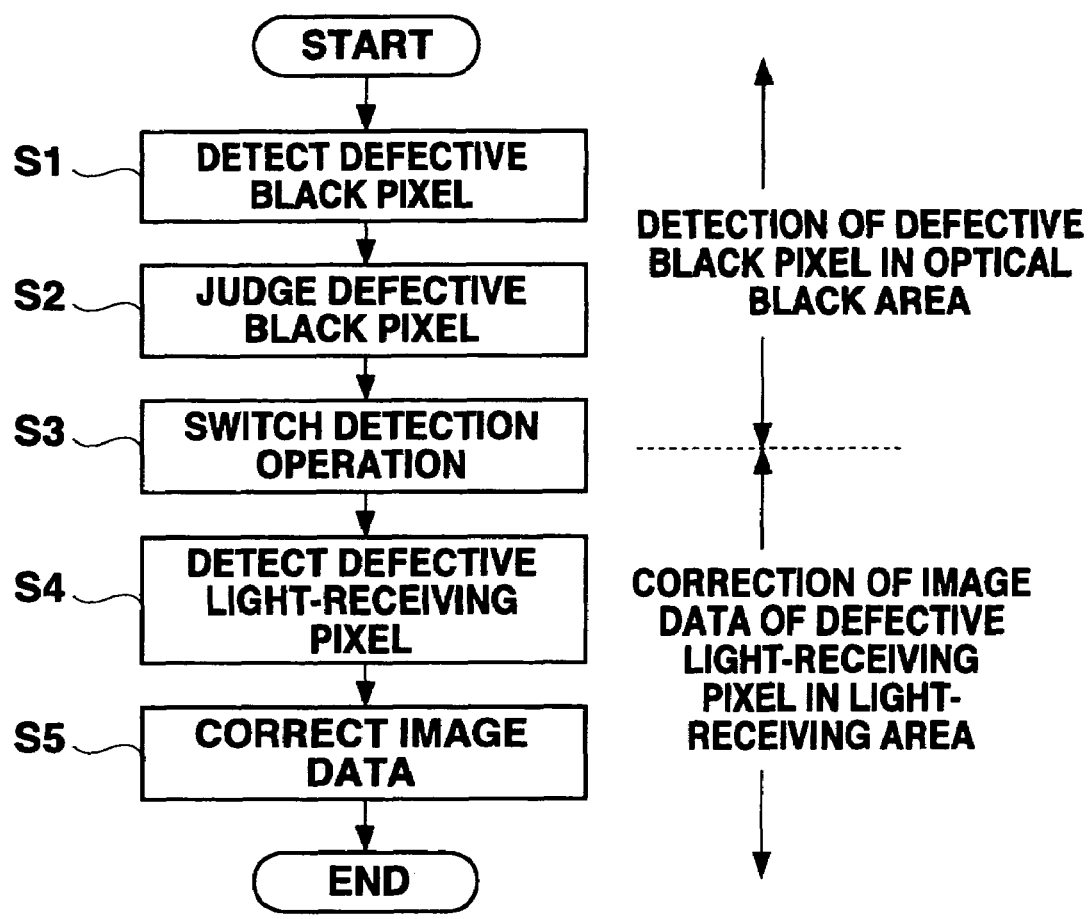
FIG. 4 is a flowchart for illustrating the operation of the embodiment of FIG. 1.

The flowchart of FIG. 4 is referred to while the signal processing apparatus having the configuration described above is described.

First, at a step S1, detection of a candidate for the defective black pixel is performed. At the step S1, an imaging operation is started to generate the black data B(n), and the candidate of the defective black pixel is detected among the generated black data B(n). In this case, the selection signal SEL to be supplied to the defect detection circuit 72 instructs the detection of the defective black pixel, and as a result, among all of the output signals from the A/D conversion circuit 16, only the output signals from the A/D conversion circuit 16 for a period during which the black data (n) is input are made objects of defect detection. At the step S1, the detection of the candidate for the defective black pixel is performed for all of the black pixels in a screen. The detection of the candidates of the defect black pixels included in one screen at the start of imaging is thus performed.

Figure 5:
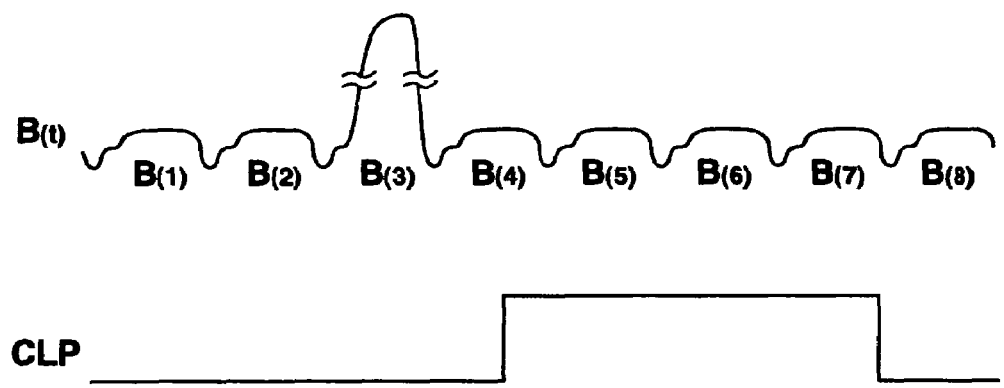
FIG. 5 is a timing chart for illustrating a state of a clamp pulse CLP.
Figure 6:
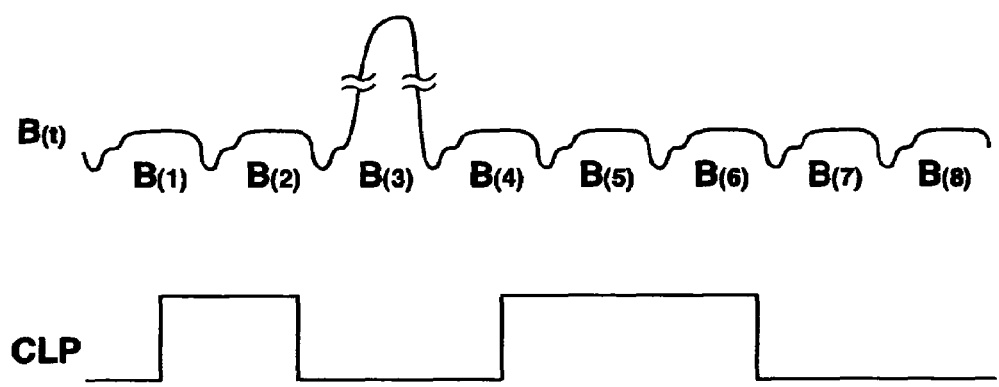
FIG. 6 is a timing chart for illustrating another state of the clamp pulse CLP.

Next, at a step S2, the true defective black pixel is judged among the candidates of the defective black pixel. At the step S2, the imaging of a plurality of screens of a second screen, a third screen and so forth is performed successively to the imaging at the step S1. At every imaging, a candidate for the defective black pixel is detected similarly at the step S1. When the detection of the candidates for the defective black pixels over a plurality of screens is completed, true defective black pixels are judged among the candidates for the defective black pixels for the plurality of screens. After that, the position information of the black pixels judged to be the true defective black pixels is generated to be stored in the position memory 78. Then, in the imaging processing after that, the clamp pulse CLP is generated in accordance with the position information stored in the position memory 78. When the position information of the defective black pixel and the position of the clamp pulse CLP in the rise state thereof overlap with each other, the rise of the clamp pulse CLP cancelled as shown in FIG. 5. Moreover, as shown in FIG. 6, the clamp pulse CLP raised in order to avoid the black reference value B(t) indicated by the position information of the defective black pixel. As a result, because the influences of the defective black pixels can be avoided, an unprepared rise of the voltage level of the black reference value B(t) after the clamp processing can be prevented. Consequently, the value of the second image data Y(n2) does not take any smaller values than the actual value even after the subtraction processing of the A/D conversion circuit 16, and the crosscut image, in which only some lines are seen to be relatively darker, can be prevented.

Next, at a step S3, the detection operation of the defect detection circuit 72 is switched. At the step S3, the level of the selection signal SEL is inverted, and the instruction is switched from the detection of the defective black pixel to the detection of the defective light-receiving pixel. Consequently, the period during which the black data B(n) is input in the period during which the output signal from the A/D conversion circuit 16 is input is excepted from the object of defect detection, and conversely only the period during which the second image data Y(n2) is input is turned to be the object of defect detection.

Next, at a step S4, the setting of the judgment reference range and the comparison with the set judgment reference range of the second image data Y(n2), which is sequentially input into the defect detection circuit 72, are sequentially performed. Then, the first detection signal DS1 is raised in response to the detection of the defective light-receiving pixel.

Next, at a step S5, correction processing is performed for the defective light-receiving pixels detected at the step S4. At the step S5, the image data Y(n) of the defective light-receiving pixel is replaced with correction data Y'(n) in response to the raise of the first detection signal DS1 by the defect detection circuit 72. Moreover, in the processing at the step S5, the confirmation of the continuity of the defective pixel judgment is not performed, unlike the processing at the step S2 mentioned above, and the correction processing of the image data judged to be the defective light-receiving pixel is performed in real time. Consequently, a memory capable of storing the position information of the image data for one screen does not need to be prepared, and then the increase of a chip area and the increase of costs can be avoided. In addition to this, the correction processing is performed not only for the data to be noise owing to a defective pixel but also similarly for the data to be noise owing to a factor other than the defective pixel. At this time, because the correction processing is not performed for the image data which is not any noise, resolution is not remarkably lowered, and consequently good reproduction images can be obtained.

Figure 7:
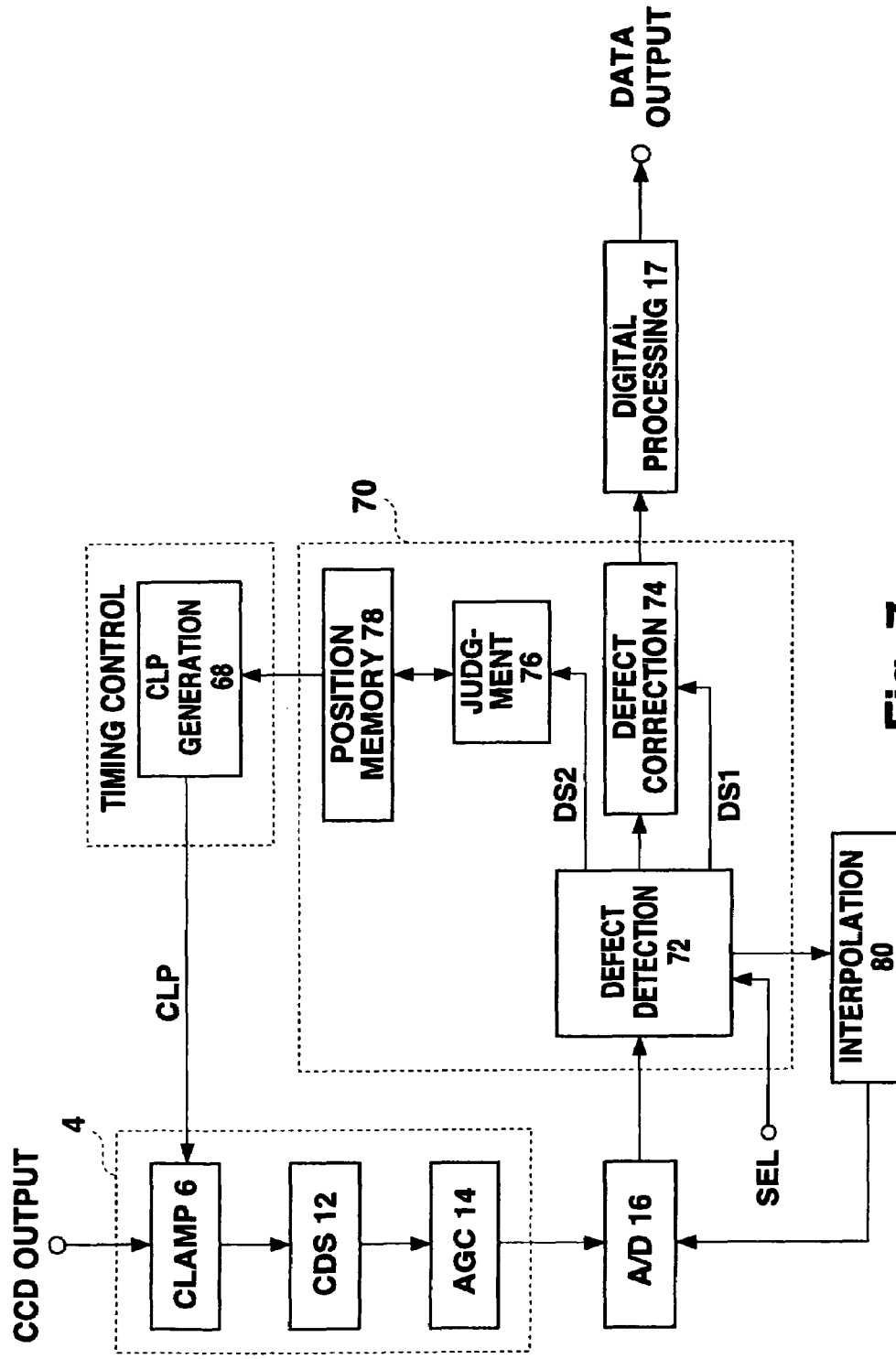
FIG. 7 is a block diagram showing the configuration of a second embodiment.

FIG. 7 is a block diagram showing the configuration of a second embodiment of the present invention. The second embodiment differs from the first embodiment in that an interpolation circuit 80 is provided to perform the interpolation of the black data B(n) of a line including defective pixels on the basis of the black data B(n) of another line.

When many pixels judged to be the defective black pixels are included in the black pixels in a line, the interpolation circuit 80 stores the black data B(n) of a line other than the former line. Then, the black reference value B(t1) of a line including a high rate of the defective black pixels is input into the A/D conversion circuit 16, the interpolation circuit 80 outputs the stored black reference value B(t1) of the line other than the former line to the A/D conversion circuit 16. That is, when many defective black pixels are included in a black pixel area for a line, a shortage of the clamp period is produced in the case where the clamp pulse CLP is raised to avoid the line. Accordingly, the raise of the clamp pulse CLP to the line is omitted, and the interpolation using the black reference value B(t1) of the line other than the former line is performed in place of the raise of the clamp pulse CLP.

What is claimed is:

1. A signal processing apparatus for performing predetermined processing of an image signal output from an imaging device including an optical black area in at least a part of a light-receiving pixel area, the image signal including a black reference value corresponding to said optical black area in a part of a horizontal scanning period or a vertical scanning period, said apparatus comprising:
   a clamp pulse generation circuit for generating a clamp pulse in synchronization with the image signal;
   a clamp circuit for clamping the black reference value in response to the clamp pulse; and
   a defect detection circuit for detecting a defective pixel included in said optical black area, wherein
   said clamp pulse generation circuit cancels a rise of the clamp pulse when a position of the defective pixel in said optical black area, the defective pixel detected by said defect detecting circuit, and a position of a rise state of the clamp pulse overlap with each other.

2. The signal processing apparatus according to claim 1, further comprising a memory for storing position information generated by said defect detection circuit.

3. The signal processing apparatus according to claim 1, further comprising an interpolation circuit for performing interpolation of the black reference value of a line including the defective pixel on the basis of a black reference value of another line.

4. The signal processing apparatus according to claim 2, further comprising an interpolation circuit for performing interpolation of the black reference value of a line including the defective pixel on the basis of a black reference value of another line.

5. The signal processing apparatus according to claim 1, wherein said defect detection circuit detects a defect signal from the image signal obtained from a light-receiving pixel in said light-receiving pixel area; said signal processing apparatus further comprising a defect correction circuit for correcting the defect signal detected by said defect detection circuit.

6. The signal processing apparatus according to claim 5, wherein said defect detection circuit operates in accordance with a selection signal instructing either detection of a defective pixel in said optical black area or detection of the defection signal included in the image signal obtained from the light-receiving pixel, and detection operation of said defect detection circuit is switched in conformity with the selection signal.

* * * * *